United States Patent [19]

Mayama et al.

[11] Patent Number: 5,076,550
[45] Date of Patent: Dec. 31, 1991

[54] FLUID FILLED ELASTOMERIC DAMPING DEVICE

[75] Inventors: Akihiro Mayama, Fujisawa; Masaru Takeda, Machida, both of Japan

[73] Assignee: Nissan Motor Co., Ltd., Japan

[21] Appl. No.: 623,001

[22] Filed: Dec. 6, 1990

[30] Foreign Application Priority Data

Dec. 15, 1989 [JP] Japan .................. 1-144537[U]

[51] Int. Cl.$^5$ .............................................. F16M 5/00
[52] U.S. Cl. ............................ 267/140.1 C; 267/219; 248/562
[58] Field of Search ............. 267/140.1 AE, 140.1 A, 267/140.1 E, 140.1 R, 140.1 C, 35, 219, 136; 248/550, 562, 566, 636, 638; 180/300, 312

[56] References Cited

U.S. PATENT DOCUMENTS

| | | | |
|---|---|---|---|
| 4,793,600 | 12/1988 | Kojima | 267/140.1 |
| 4,805,884 | 2/1989 | Jordens et al. | 267/140.1 |
| 4,858,899 | 8/1989 | Saotome et al. | 267/219 |
| 4,872,650 | 10/1989 | Tabata et al. | 267/219 |
| 5,029,825 | 7/1991 | Doi | 267/219 |

FOREIGN PATENT DOCUMENTS

| | | | |
|---|---|---|---|
| 0154268 | 9/1985 | European Pat. Off. | 248/562 |
| 243714 | 4/1987 | European Pat. Off. | |
| 258998 | 7/1987 | European Pat. Off. | |
| 62-91037 | 10/1987 | Japan . | |
| 2164416 | 9/1985 | United Kingdom . | |

Primary Examiner—Robert J. Oberleitner
Assistant Examiner—Chris Schwartz
Attorney, Agent, or Firm—Lowe, Price, LeBlanc & Becker

[57] ABSTRACT

A fluid filled elastomeric damping device has a diaphragm enclosing a working chamber and a diaphragm restraining mechanism for selectively restraining and freeing movement of the diaphragm and thereby varying a damping or operational characteristic of the device. The mechanism includes a pressing plate for pressing a blocking portion of the diaphragm against a seating surface of an outer casing member under a bias of a blocking force generating member and thereby rigidly closing a compensation passage communicating with the working chamber. The diaphragm is restrained in movement by the pressing plate when the solenoid is de-energized and freed in movement when the solenoid is energized.

20 Claims, 7 Drawing Sheets

5,076,550

FLUID FILLED ELASTOMERIC DAMPING DEVICE

BACKGROUND OF THE INVENTION

1. Field of the Invention

The present invention relates to a fluid filled elastomeric damping device which is used as a power unit mounting to a vehicle body or the like.

2. Description of the Prior Art

An example of a prior art power unit mounting, as is disclosed in Japanese Utility Model Provisional Publication No. 62-91037, includes two fluid chambers, an orifice for providing communication between the fluid chambers, a diaphragm partly defining one of the fluid chambers and a diaphragm restraining mechanism for selectively restraining and freeing movement of the diaphragm and thereby enabling the power unit mounting to have two different resonance frequencies or operational characteristics. In this instance, the power unit mounting has a damping or oscillatory system a mass and spring of which are constituted by the fluid within the orifice and the resilient walls enclosing the fluid chambers, i.e., the resilience in expansion and contraction of the fluid chambers, respectively. The resonance frequency can therefore be varied by varying the mass and/or spring, and in case of the above prior art mounting the different resonance frequencies or operational characteristics are obtained by varying the resilience in expansion and contraction of the fluid chambers.

A problem of the prior art power unit mounting is that the diaphragm in a state of being restrained in movement is liable to move in response to a variation of the pressure in the associated fluid chamber, making it imposible to attain a desired damping action at the time of restraint of the diaphragm.

SUMMARY OF THE INVENTION

In accordance with the present invention, there is provided a fluid filled elastomeric damping device which comprises rigid inner and outer casing members having a space therebetween, a main resilient deformable member disposed within the space to connect the inner and outer casing members together and thereby subdividing the space into a plurality of pockets, first and second working chambers in the pockets enclosed between the main resilient deformable member and the outer casing member, the first and second working chambers containing a fluid, a restrictive fluid passageway between the outer casing member and the resilient deformable member to provide communication between the first and second working chambers, a diaphragm sealingly attached at its outer periphery to the outer casing to serve as a wall enclosing the first working chamber, and diaphragm restraining means for selectively restraining and freeing movement of the diaphragm and thereby varying an operational characteristic of the device.

The above structure may follow the conventional fashion.

In accorance with the present invention, the outer casing member has a compensation passage having one end connected with the first working chamber and the other end associated with the diaphragm. The outer casing also has a seating surface around the other end of the compensation passage. The diaphragm restraining means includes a pressing plate disposed outside of the diaphragm for urging the diaphragm against the seating surface of the outer casing member and thereby restricting movement of the diaphragm.

This structure is effective for solving the above noted problem inherent in the prior art device.

It is accordingly an object of the present invention to provide a novel and improved fluid filled elatomeric damping device which can damp various kinds of vibrations with efficiency and assuredness.

It is another object of the present invention to provide a novel and improved fluid filled elastomeric damping device of the above described character which can assure an intended damping action at the time of restraint of a diaphragm enclosing a working chamber.

It is a further object of the present invention to provide a novel and improved fluid filled elastomeric damping device of the above described character which is suited for use as a power unit mounting for automobiles or the like.

BRIEF DESCRIPTION OF THE DRAWINGS

FIG. 7 is a graph of a dynamic spring constant-vibration frequency characteristic of the elastomeric damping device of FIG. 5 with its diaphragm being restrained in movement; and FIG. 8 is a graph of a dynamic spring constant-vibration frequency characteristic of the elatomeric damping device of FIG. 6 with its diaphragm being freed in movement.

DESCRIPTION OF THE PREFERRED EMBODIMENTS

Figure 1A:
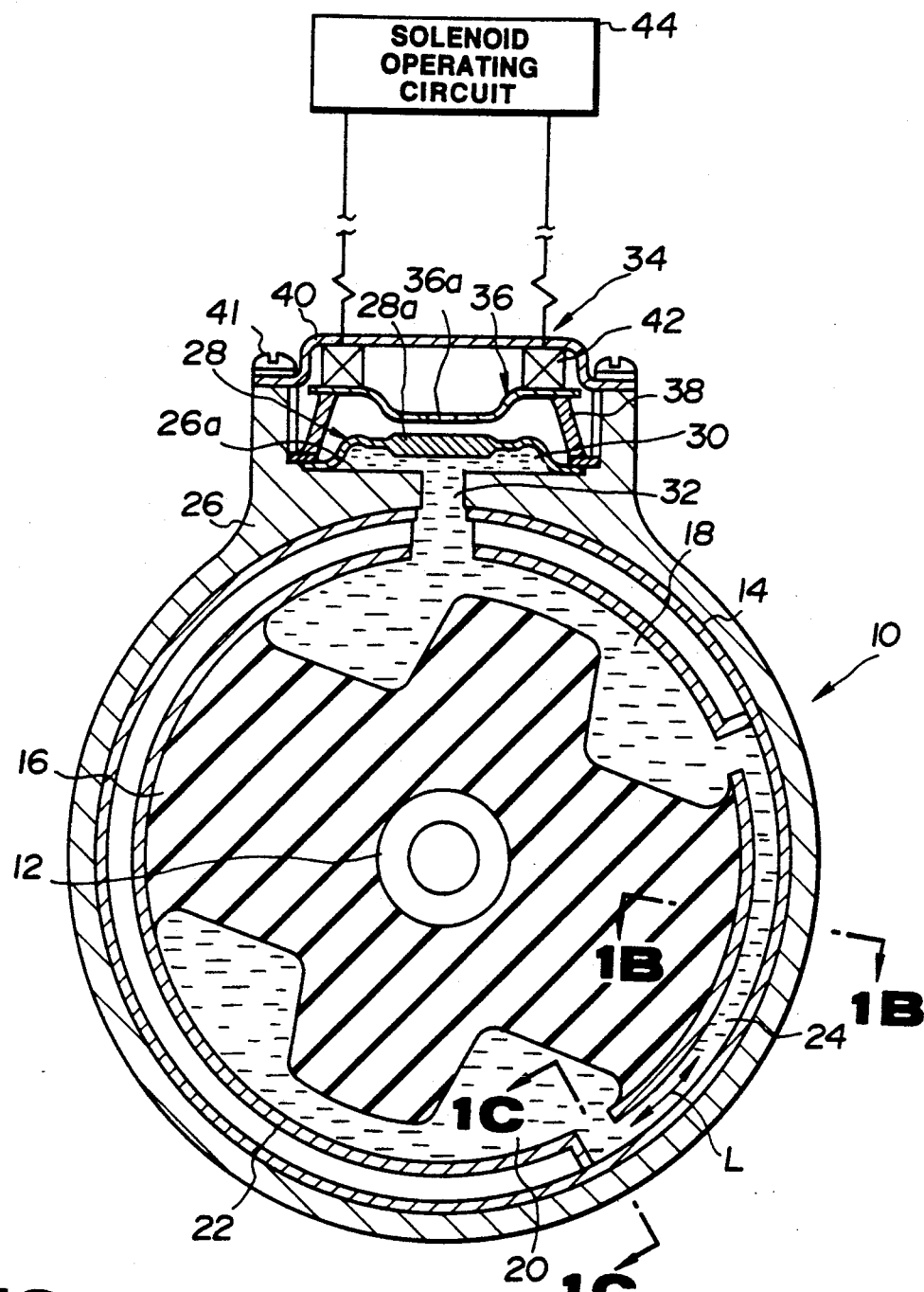
FIG. 1A is a sectional view of a fluid filled elastomeric damping device according to an embodiment of the present invention and having a diaphragm in a state of being freed in movement.
Figure 1B:
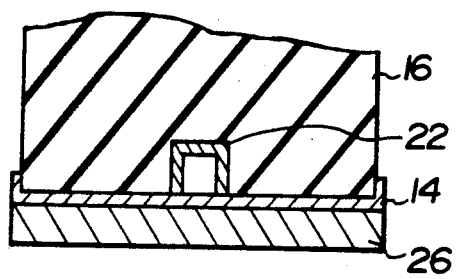
FIG. 1B is a sectional view taken along the line 1B—1B of FIG. 1A.
Figure 1C:
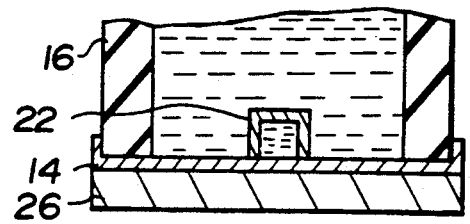
FIG. 1C is a setional view taken along the line 1C—1C of FIG. 1A.

Referring first to FIGS. 1A-1C and 2-3 inclusive, a fluid filled elastomeric damping device according to an embodiment of the present invention is generally designated by 10 and includes concentric rigid inner and outer sleeves 12, 14 and an elastomeric or resilient deformable member 16 interposed between the inner and outer sleeves 12, 14 and bonded to same by sulfurization.

The resilient deformable member 16 bounds or defines on one side thereof, i.e., on the upper side thereof in the drawings a first working chamber 18 filled with hydraulic fluid "L" and on the other side thereof, i.e., on the lower side thereof in the drawings a second working chamber 20 filled with hydraulic fluid "L".

A rigid circular member 22 of a U-like cross section is interposed between the outer sleeve 14 and the resilient deformable member 16 to define therebetween a part-circular orifice or restrictive fluid passageway 24 extending along the inner periphery of the outer sleeve 14 to provide communication between the first and second working chambers 18, 20.

The outer sleeve 14 is fitted in a hollow generally cylindrical housing 26 having at the outer periphery thereof a planar seating surface 26a. A circular diaphragm 28 is attached to the housing 26 to serve as a wall enclosing the first working chamber 18. More specifically, the diaphragm 28 is sealingly attached at its outer periphery to the seating surface 26a of the housing 26 to bound or define therebetween a compensation chamber 30 communicating with the first working chamber 18 through a compensation passage 32 extending radially through the housing 26 and outer sleeve 14. The diaphragm 28 has a thick-walled central portion or blocking portion 28a for contact with the seating surface 26a of the housing 26 for thereby stopping up or sealingly closing the compensation passage 32. In this instance, the blocking portion 28a of the diaphragm 28 can rigidly close the compensation passage 32 since it is clamped between the seating surface 26a of the housing 26 and the pressing plate 36 and further since the blocking portion 28a of the diaphragm 28 is supported or backed up generally at its entirety of an outer side thereof by the pressing plate 36.

A diaphragm restraining mechanism 34 is provided for pressing the blocking portion 28a of the diaphragm 28 against the seating surface 26a of the housing 26 and thereby restraining movement of the diaphragm 28. The diaphragm restraining mechanism 34 includes a circular pressing plate 36 disposed outside of the diaphragm 28 and formed with a central opening 36a, a blocking force generating member 38 interposed between the pressing plate 36 and housing 26 for urging the pressing plate 36 and therefore the diaphragm 28 toward the seating surface 26a of the housing 26, a solenoid support 40 disposed outside of the pressing plate 36 and attached to the housing 26 with screws 41, a solenoid 42 installed on the solenoid support 40 for attracting, when energized, the pressing plate 36 thereto by prevailing the blocking force exerted by the blocking force generating member 38, and a solenoid operating circuit 44 for operating the solenoid 42 in such a manner that the solenoid 42 is energized at stoppage of a vehicle and de-energized at running.

More specifically, the blocking force generating member 38 is in the form of a resiliently deformable tubular member secured at an axial end to the outer peripheral portion of the pressing plate 36 and at the other end to a portion of the housing 26 surrounding the seating surface 26a. The tubular member 38 is arranged in a tensioned state such that it is always urged to contract axially and thereby to press, when the solenoid 42 is de-energized, the blocking portion 28a of the diaphragm 28 against the seating surface 26a of the housing 26 by way of the pressing plate 36. The pressing plate 36 is in the form of a shallow dish having an annular flat peripheral flange portion and a central portion protruding toward the blocking portion 28a of the diaphragm 28. The central opening 36a of the pressing plate 36 serves as an air vent for venting a chamber defined by the diaphragm 28, blocking force generating member 38 and pressing plate 36.

Figure 3:
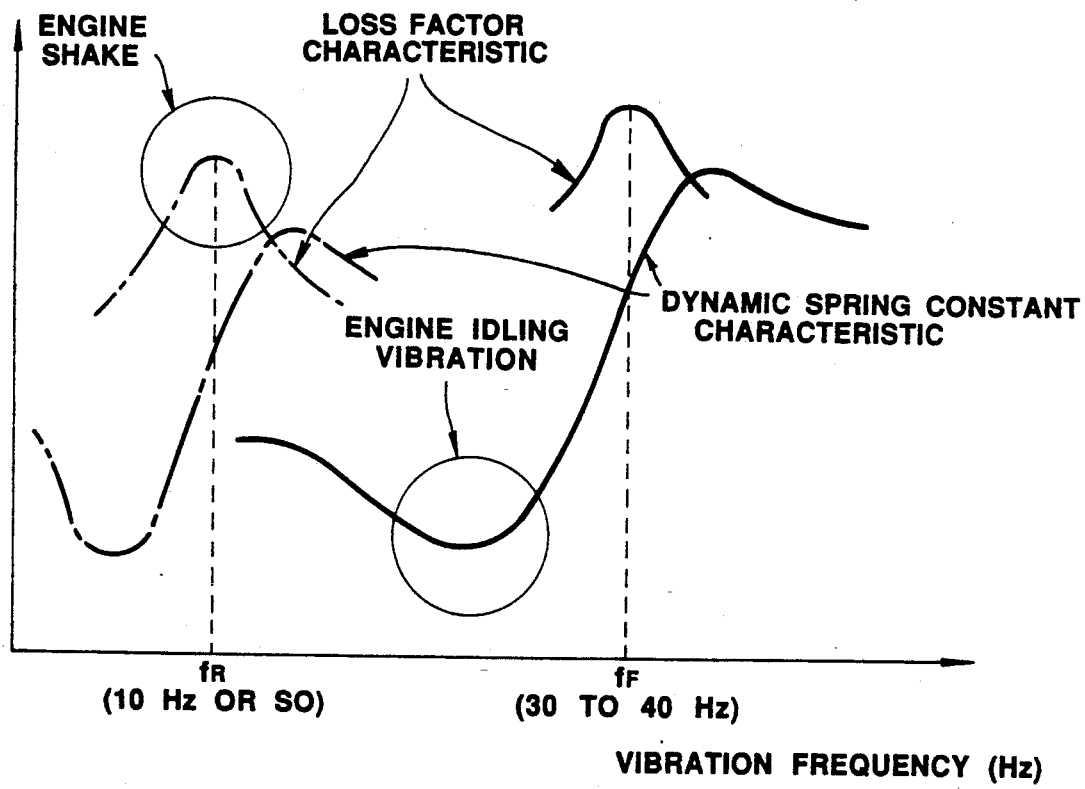
FIG. 3 is a graph of a dynamic spring constant-vibration frequency characteristic and a loss factor-vibration frequency characteristic of the elastomeric damping device of FIG. 1A.

With the foregoing structure, two oscillatory systems are provided to the elastomeric damping device 10. A first oscillatory system is constituted by the first working chamber 18, compesation chamber 30 and compensation passage 32. That is, the mass and spring of the first oscillatory system are constituted by the fluid within the compensation passage 32 and the resilient walls defining the first working chamber 18 and compensation chamber 30, i.e., the resilience in expansion and contraction of the first working chamber 18 and compensation chamber 30, respectively. The compensation passage 32 is shorter than the restrictive fluid passageway 24 and serves as an orifice or restrictive fluid passageway when the diaphragm 28 is freed in movement. In this embodiment, the first oscillatory system is set to resonate at a frequency $f_F$ ranging from 30 Hz to 40 Hz for the purpose of efficiently damping idling vibration. In this connection, the dynamic spring constant of the first oscillatory system, as shown in the graph of FIG. 3, is adapted to reduce to a minimum value when the elastomeric damping device 10 is subjected to engine idling vibration smaller than the resonance frequency $f_F$. The first oscillatory system becomes effective when the diaphragm 28 is freed in movement as shown in FIG. 1A.

Figure 2:
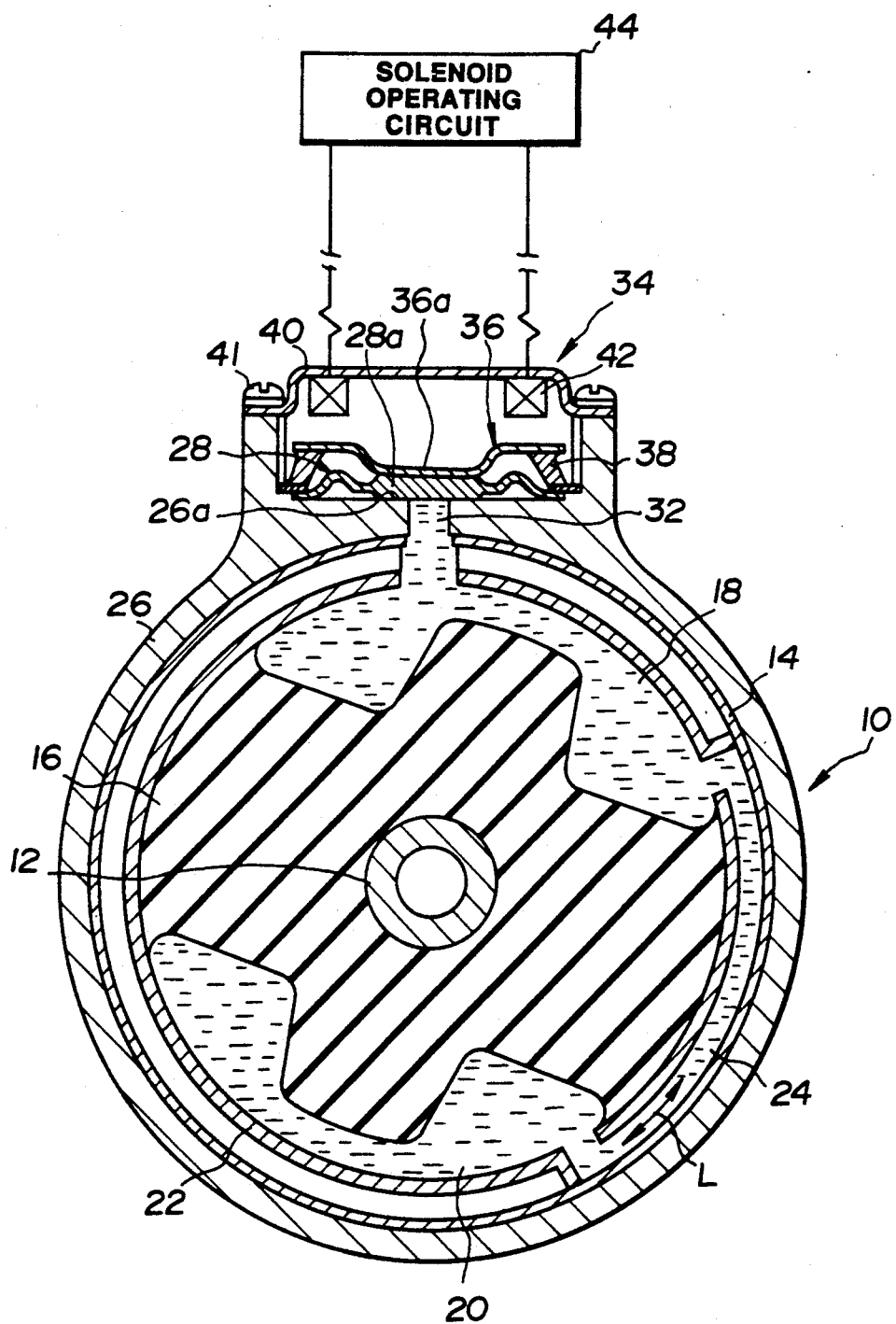
FIG. 2 is a view similar to FIG. 1A but shows the diaphragm in a state of being restrained in movement.

A second oscillatory system is constitued by the first and second working chambers 18, 20 and restrictive fluid passageway 24 when the diaphragm 28 is restrained in movement as shown in FIG. 2. That is, the mass and spring of the second oscillatory system are constituted by the fluid within the restricitve fluid passageway 24 and resilient walls defining the first and second working chambers 18, 20, i.e., the resilience in expansion and contraction of the first and second working chambers 18, 20, respectively. In this embodiment, the second oscillatory system is set to resonate at a frequency $f_R$ of 10 Hz or so for the purpose of efficiently damping engine shake. In this connection, the restrictive fluid passageway 24 effects a flow resistance or loss factor as represented by the one-dot chain line curve in FIG. 3 when the elastomeric damping device 10 is subjected to vibration of the frequency of 10 Hz or so. The second oscillatory system becomes effective when the diaphragm 28 is restrained in movement as shown in FIG. 2.

The elastomeric damping device 10 operates as follows:

(a) During stoppage of vehicle

During stoppage of the vehicle, the solenoid 42 is energized by the solenoid operating circuit 44, thus electromagnetically attracting the pressing plate 36 thereto and thereby putting the diaphragm 28 into a state of being freed in movement as shown in FIG. 1A.

During stoppage of the vehicle with its engine being operated to idle, the elastomeric damping device 10 is subjected to engine idling vibration of the frequency of 30 Hz and below. In this instance, since the diaphragm 28 is freed in movement or released from restraint by the pressing plate 36, the elastomeric damping device 10 becomes resonant at a frequency $f_F$ ranging from 30 Hz to 40 Hz and is given the dynamic spring constant characteristic represented by the solid line curve in FIG. 3. Thus, engine idling vibration of the frequency of 30 Hz and below is reduced efficiently mainly by the effect of resilient deformation of the first working chamber 18 and compensation chamber 30 but also by the effect of the flow resistance caused by the compensation passage 32. In this instance, a flow resistance or loss factor represented by the solid line curve in FIG. 3 is caused by the compensation passage 32.

(b) During running of vehicle

During running of the vehicle, the solenoid 42 is de-energized by the solenoid operating circuit 44, thus allowing the pressing plate 36 to press the blocking portion 28a of the diaphragm 28 against the seating surface 26a of the housing 26 under the bias of the blocking force generating member 38 for thereby stopping up or sealingly closing the compensation passage 32, i.e., the diaphragm 28 is restrained in movement by the pressing plate 36.

During running of the vehicle, the elastomeric damping device 10 is subjected to engine shake of the freuqency of 10 Hz or so. In this instance, since the diaphragm 28 is restrained in movement, the elastomeric damping device 10 becomes resonant at the frequency $f_R$ of 10 Hz or so. Engine shake of the frequency of 10 Hz or so thus causes the fluid within the restrictive fluid passage 24 to flow intensely and to-and-fro or reciprocatively as indicated by the arrow in FIGS. 1A and 2 and is efficiently damped or attenuated mainly by the effect of the flow resistance or loss factor caused by the restrictive fluid passageway 24 but also by the effect of the resilient deformation of the first and second working chambers 18, 20. In this connection, the elastomeric damping device 10 has such a dynamic spring constant characteristic as represent by the one-dot chain line curve in FIG. 3.

From the foregoing, it will be understood that the fluid filled elastomeric damping device 10 can efficiently and assuredly damp both of engine idling vibration and engine shake by selectively restraining and freeing movement of the diaphragm 28.

It will be further understood that the diaphragm 28, when pressed against the seating surface 26a of the housing 26 by means of the pressing plate 36, is assuredly prevented from movement even in case of variation of the pressure within the working chambers 18, 20 and therefore assuredly restrained in movement, thus making it possible to assure a desired damping action at the time of restraint of the diaphragm 28.

It will be further understood that since the diaphragm 28 is adapted to be restrained in movement when the solenoid 42 is de-energized during vehicle running which is longer in time than stoppage, it becomes possible to save or reduce power consumption while retaining the ability of damping engine shake even when the solenoid operating circuit 44 malfunctions due to its burning out or the like.

Figure 4:
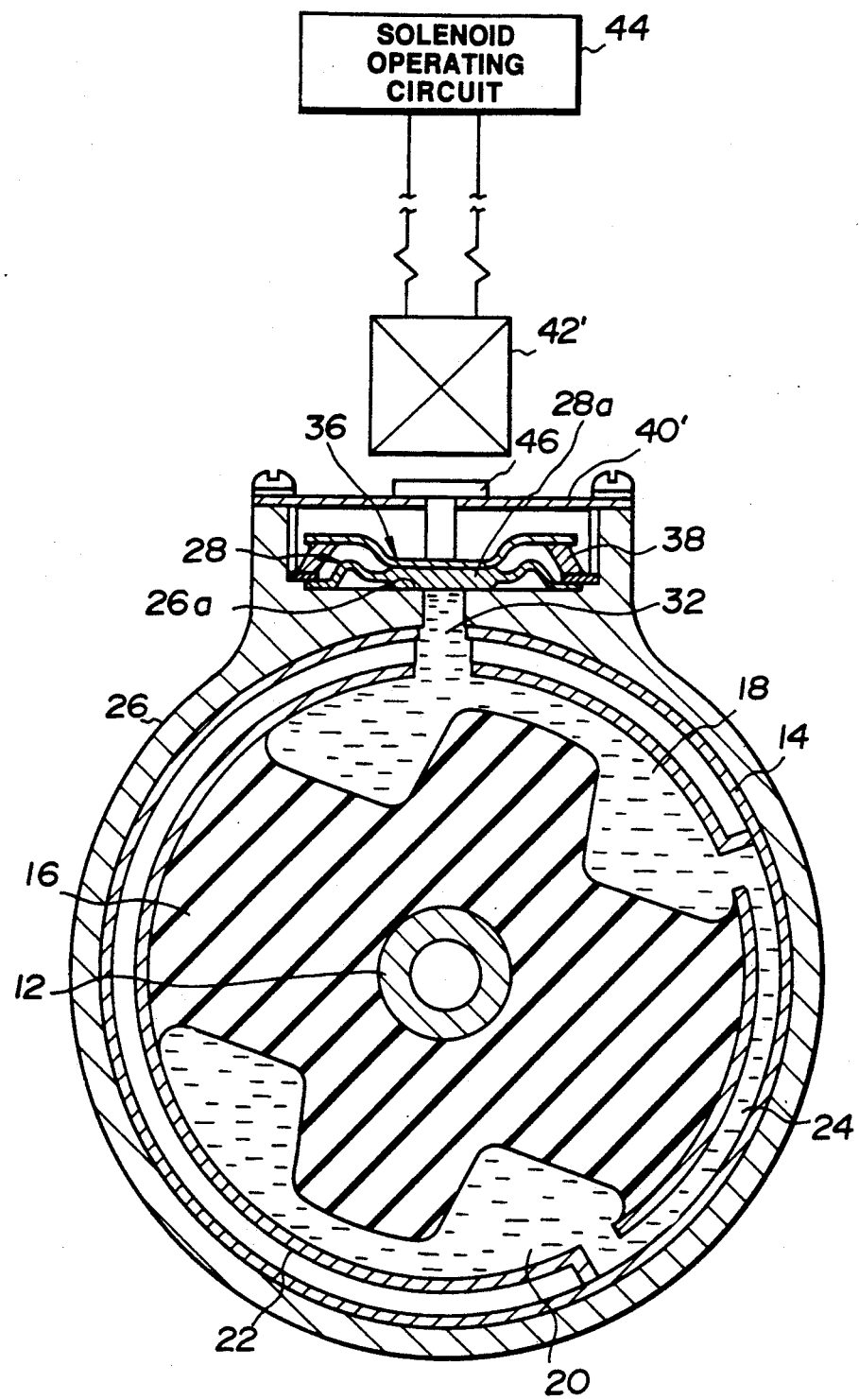
FIG. 4 is a variant of the elastomeric damping device of FIG. 1A and having a diaphragm in a state of being freed in movement.
Figure 5:
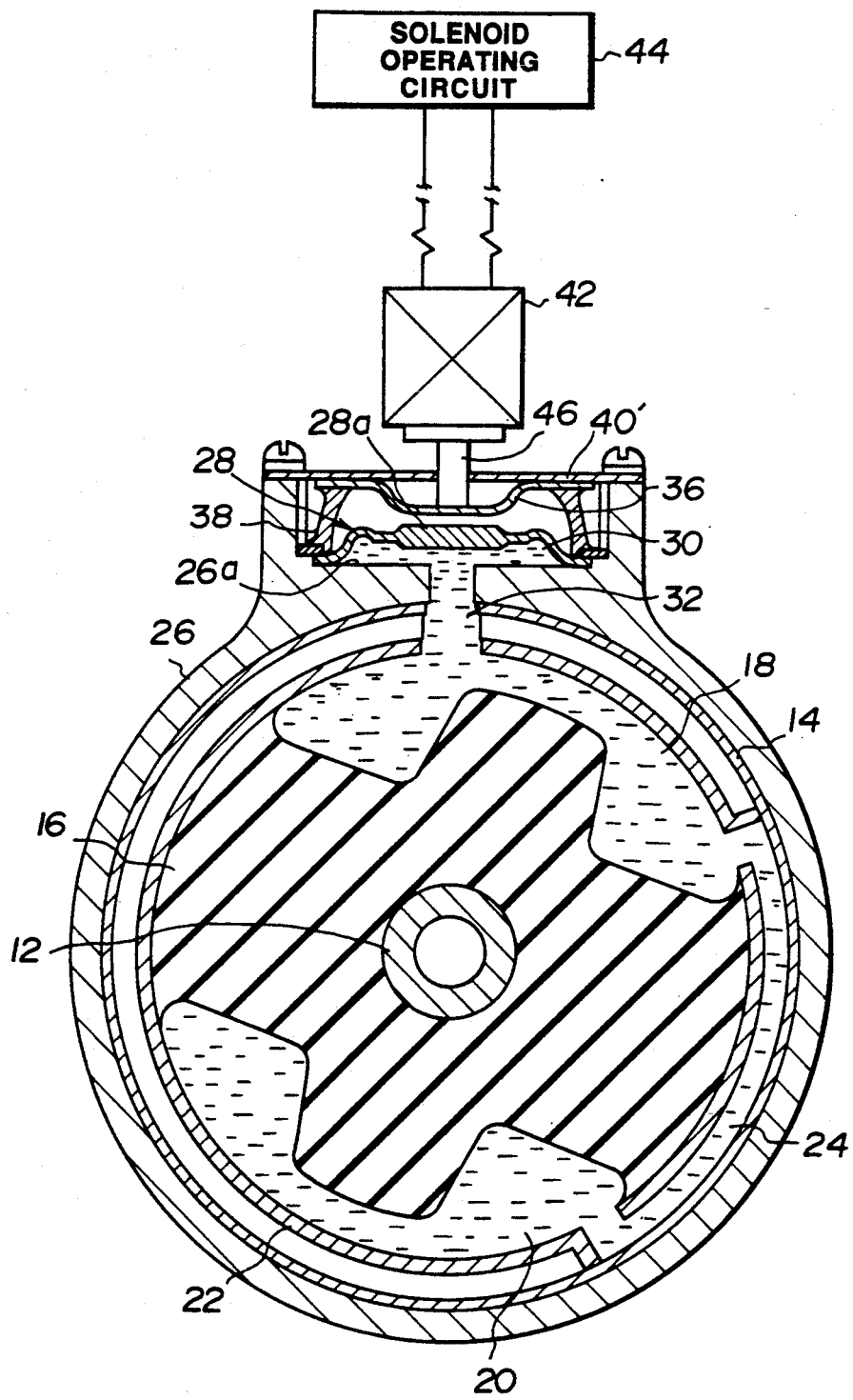
FIG. 5 is a view similar to FIG. 4 but shows the diaphragm in a state of being restrained in movement.

FIGS. 4 and 5 show a variant of the embodiment of FIGS. 1A-1C and 2-3. In FIGS. 4 and 5, like or corresponding parts and portion to those of FIGS. 1A-1C and 2-3 are designated by the same reference characters. This variant differs from the embodiment of FIGS. 1A-1C and 2-3 in that the solenoid 42' is disposed outside of the solenoid support 40' and the pressing plate 36 has secured thereto an electromagnetically attractable pin-like member 46 extending through the solenoid support 40' to have a flanged outer end such that when the solenoid 42' is engergized the pin like member 46 is attracted by the solenoid 42' while prevailing the bias of the blocking force generating member 38 for thereby putting the diaphragm 28 into a state of being freed in movement as shown in FIG. 4 and when the solenoid 42' is de-energized the pressing plate 36 is allowed to press the blocking portion 28a of the diaphragm 28 against the seating surface 26a of the housing 26 under the bias of the blocking force generating member 38 for thereby putting the diaphragm 28 into a state of being restrained in movement as shown in FIG. 5. Except for the above, this variant is substantially similar to the embodiment of FIGS. 1A-1C and 2-3 and can produce substantially the same effect.

Figure 6:
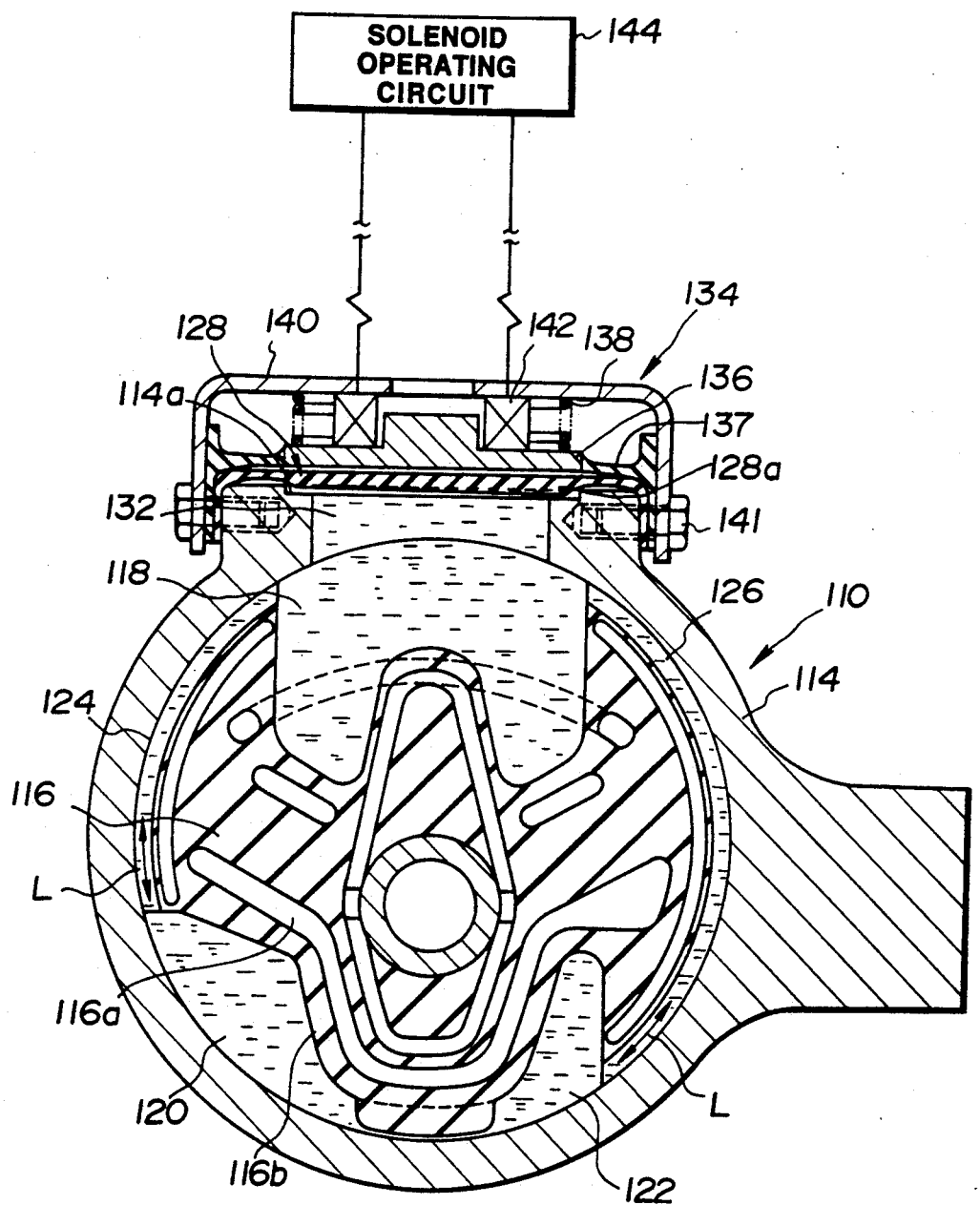
FIG. 6 is a sectional view of a fluid filled elastomeric damping device according to another embodiment of the present invention.

Referring to FIGS. 6 to 8, a fluid filled elastomeric damping device according to another embodiment of this invention is generally designated by 110 and includes rigid inner and outer sleeves 112, 114 and an elastomeric or resilient deformable member 116 interposed between the inner and outer sleeves 112, 114 and bonded to same by sulfurization.

The resilient deformable member 116 bounds or defines on one side thereof, i.e., on the upper side thereof in the drawing a working chamber 118 filled with hydraulic fluid "L" and on the other side thereof, i.e., on the lower side thereof in the drawing second and third working chambers 120, 122 filled with hydraulic fluid "L".

The resilient deformable member 116 cooperates with the outer sleeve 114 to define therebetween first and second orifices or restrictive fluid passageways 124, 126 part-circular in shape and extending along the inner periphery of the outer sleeve 114 to provide communication between the first and second working chambers 118 and 120 and between the first and third working chambers 118 and 122. In this connection, the resilient deformable member 116 has a narrow opening 116a extending along the second and third working chambers 120 and 122 to form a diaphragm-like wall 116b defining the second and third working chambers 120 and 122.

The outer sleeve 114 has a compensation passage 132 communicating with the first working chamber 118 and a planar seating surface 114a at an outer peripheral portion around the compensation passage 132. A diaphragm 128 is sealingly attached at its outer periphery to the seating surface 114a of the outer sleeve 114 to sealingly close the compensation passage 132 and thereby to serve as a wall enclosing the first working chamber 118. The diaphragm 128 has a thick-walled central portion or blocking portion 128a for contact with the seating surface 114a of the outer sleeve 114.

A diaphragm restraining mechanism 134 is provided for pressing the blocking portion 128a of the diaphragm 128 against the seating surface 114a of the outer sleeve 114 and thereby restraining movement of the diaphragm 128. The diaphragm restraining mechanism 134 includes a circular pressing plate 136 disposed outside of the diaphragm 128, a resilient support 137 secured to the outer periphery of the pressing plate 136 for resiliently supporting the same on the outer sleeve 114, a solenoid support 140 disposed outside of the pressing plate 136 and attached to the outer sleeve 114 with bolts 141, a blocking force generating member 138 in the form of a coiled spring disposed between the solenoid support 140 and pressing plate 136 for urging the pressing plate 136 and diaphragm 128 against the seating surface 114a of the housing 114, a solenoid 142 installed on the solenoid support 140 for attracting, when energized, the pressing plate 136 thereto while prevailing the blocking force exerted by the blocking force generating member 138, and a solenoid control circuit 144 for operating the solenoid 142 in such a way that the solenoid 142 which is normally de-energized, is energized at a particular engine rpm or a particular vehicle running condition in which the elastomeric damping device 110 is subjected to vibration of a relatively high frequency causative of booming sound. The diaphragm 128, when pressed against the seating surface 114a of the outer sleeve 114 by the pressing plate 128, is assuredly prevented from movement without being affected by variation of pressure within the first working chamber 118 since the blocking portion 128a of the diaphragm 128 is rigidily clamped between the seating surface 114 of the outer sleeve 114 and the pressing plate 136 while at the same time being supported or backed up generally at its entirety of an outer side thereof by the pressing plate 136. The blocking force generating member 138 in the form of a coiled spring is installed in a compressed state such that it is always urged to expand axially.

Assuming that in the above described elastomeric damping device 110 the fluid within the restrictive fluid passageways 124, 126 constitutes a mass M of a damping or oscillatory system and that the resilient walls defining the working chambers 118, 120 and 122, i.e., the resilience in expansion and contraction of the working chambers 118, 120 and 122 constitutes a spring, which is of a spring constant K, of the oscillatory system, the resonance frequency of the oscillatory system is expressed by:

$$f = \frac{1}{2\pi} \sqrt{\frac{K}{M}}$$

When the diaphragm 128 is restricted in movement, the elastomeric damping device 110 can have two oscillatory systems of different resonance frequencies. That is, a first oscillatory system is constituted by the first and second working chambers 118, 120 and first restrictive fluid passageway 124. A second oscillatory system is constituted by the first and third working chambers 118, 122 and second restrictive fluid passageway 126. In this instance, since the first restrictive fluid passageway 124 is shorter than the second restrictive fluid passageway 126, the mass M of the first oscillatory system becomes smaller, thus enabling the first oscillatory system to be set at a higher resonance frequency. In this embodiment, the first oscillatory system is set to resonate at a frequency $f_{R1}$ ranging from 30 Hz to 40 Hz for the purpose of efficiently damping engine idling vibration. In this connection, the dynamic spring constant of the first oscillatory system, as shown in FIG. 7, is adapted to reduce to a minimum value when the elastomeric damping device 110 is subjected to engine idling vibration smaller than the resonance frequency $f_{R1}$.

On the other hand, since the second restrictive fluid passageway 126 is longer than the first restrictive fluid passageway 124, the mass M of the second oscillatory system becomes larger, thus enabling the second oscillatory system to be set at a lower resonance frequency. In this embodiment, the second oscillatory system is set to resonate at a frequency $f_{R2}$ of 10 Hz or so for the purpose of efficiently damping engine shake. In this connection, the elastomeric damping device 110 is adapted to effect such a loss factor characteristic as shown in FIG. 7 when subjected to engine shake of the frequency of 10 Hz or so.

When the diaphragm 128 is freed in movement, the elastomeric damping device 110 is adapted to resonate at a frequency $f_F$ of 200 Hz or so and given such a dynamic spring constant characteristic as represented by the solid line curve in FIG. 8. That is, the first working chamber 118 becomes more resiliently deformable in response to a vibration of a very high frequency, i.e., a booming sound to damp or attenuate the same efficiently.

The elastomeric damping device 110 operates as follows:

(a) During normal running

During stoppage or normal running, the solenoid 142 is de-energized by means of the solenoid operating circuit 144, thus allowing the pressing plate 136 and therefore the blocking portion 128a of the diaphragm 128 to be pressed against the seating surface 114a of the outer sleeve 114 under the bias of the blocking force generating member 138 and thereby putting the diaphragm 128 into a state of being restrained in movement.

Under this condition and with the engine being operated to idle, the elastomeric damping device 110 is subjected to engine idling vibration of a frequency of 30 Hz and below. In this instance, the elastomeric damping device 110 becomes resonant at a frequency $f_{R1}$ ranging from 30 Hz to 40 Hz and is given the dynamic spring constant characteristic shown in FIG. 7. Thus, engine idling vibration of the frequency of 30 Hz and below is reduced efficiently mainly by the effect of resilient deformation of the first and second working chambers 118, 120.

The elastomeric damping device 110 of this invention thus can efficiently damp engine idling vibration of the frequency of 30 Hz and below by making use of the decrease of the dynamic spring constant.

Further, during running of the vehicle, the elastomeric damping device 110 is subjected to engine shake of the frequency of 10 Hz or so. In this instance, since the elastomeric damping device 110 becomes resonant at the frequency $f_{R2}$ of 10 Hz or so, the fluid within the second restrictive fluid passageway 126 is caused to flow intensely and to-and-fro or reciprocatively through the second restrictive fluid passageway 126 as indicated by the arrow in FIG. 6, whereby to efficiently damp the engine shake mainly by the effect of the flow resistance or loss factor caused by the second restrictive fluid passageway 126.

The elastomeric damping device 110 thus can efficiently damp engine shake of a frequency of 10 Hz or so by mainly making use of the flow resistance or loss factor caused by the second restrictive passageway 126.

(b) During particular running of vehicle

During particular engine rpm or particular running where the elastomeric damping device 110 is subjected to vibration in a particular high frequency range which is causative of a booming sound, the solenoid 142 is energized by means of the solenoid operating circuit 144, thus allowing the pressing plate 136 to be electromagnetically attracted to the solenoid 142 and thereby putting the diaphragm 128 into a state of being free in movement.

During this particular running, the elastomeric damping device 110 is subjected to vibration of the frequency of 140 Hz or so. In this instance, since the diaphragm 128 is freed in movement and the elastomeric damping device 110 is given such a dynamic spring constant characteristic as shown in FIG. 8, the vibration of the frequency of 140 Hz or so, i.e., a booming sound is efficiently damped mainly by the effect of the resilient deformation of the first working chamber 118, i.e., the diaphragm 118.

From the foregoing, it will be understood that the elastomeric damping device 110 according to another embodiment of this invention can efficiently damp both of engine idling vibration and engine shake when the diaphragm 128 is restrained in movement.

It will be further understood that since the diaphragm 128 is adapted to be rigidly pressed at its blocking portion 128a against the seating surface 126a of the outer sleeve housing 126, it is assuredly prevented from movement without being affected by variation of pressure in the working chamber 118, thus making it possible to attain a high restraint of movement of the diaphragm 128 when desired and therefore an intended efficient damping of vibration.

It will be further understood that the elastomeric damping device 110 can damp a booming sound when the diaphragm 128 is freed in movement.

It will be further understood that since the diaphragm 128 is restrained in movement when the solenoid 142 is de-energized during normal running of the vehicle which is longer in time than particular running, it becomes possible to save or reduce power consumption while retaining the ability of damping engine idling vibration and engine shake even when the solenoid control circuit 144 malfunctions due to its burning out or the like.

While the elastomeric damping device has been described and shown as being constituted by inner and outer circular sleeves, this is not limitative but the sleeves may be formed into various shapes.

What is claimed is:

1. A fluid filled elastomeric damping device comprising:
   rigid inner and outer casing members having a space therebetween;
   a main resilient deformable member disposed within said space to connect said inner and outer casing members together and thereby subdividing said space into a plurality of pockets;
   first and second working chambers in said pockets enclosed between said main resilient deformable member and said outer casing member, said first and second working chambers containing a fluid;
   a restrictive fluid passageway between said outer casing member and said resilient deformable member to provide communication between said first and second working chambers;
   a diaphragm sealingly attached at its outer periphery to said outer casing to serve as a wall enclosing said first working chamber; and
   diaphragm restraining means for selectively restraining and freeing movement of said diaphragm and thereby varying an operational characteristic of the device;
   said outer casing having a compensation passage having one end connected with said first working chamber and the other end associated with said diaphragm, said outer casing also having a seating surface around the other end of said compensation passage;
   said diaphragm restraining means including a pressing plate disposed outside of said diaphragm for urging said diaphragm against said seating surface of said outer casing member and thereby restricting movement of said diaphragm.

2. The elastomeric damping device according to claim 1, wherein said diaphragm has a blocking portion in the form of a thick-walled portion, said blocking portion being clamped between said seating surface of said outer casing member and said pressing plate when said diaphragm being urged against said seating surface of said outer casing member by said pressing plate.

3. The elastomeric damping device according to claim 2, wherein said blocking portion of said diaphragm is backed up generally at its entirety of an outer side thereof by said pressing plate.

4. The elastomeric damping device according to claim 3, further comprising a compensation chamber between said diaphragm and said seating surface and communicable with said first working chamber through said compensation package.

5. The elastomeric damping device according to claim 4, wherein said diaphragm restraining means further comprises a blocking force generating member disposed between said pressing plate and an outer peripheral portion of said outer casing member around said seating surface for urging said pressing plate together with said diaphragm against said seating surface of said outer casing member.

6. The elastomeric damping device according to claim 5, wherein said blocking force generating member is in the form of a tubular resilient member attached at one axial end to said peripheral portion of said outer casing member around said seating surface and at the other axial end to said pressing plate, said blocking force generating member being installed in a tensioned state such that it is always urged to contract axially.

7. The elastomeric damping device according to claim 6, wherein said diaphragm restraining means further comprises a solenoid support disposed outside of said pressing plate and attached to said outer casing member, a solenoid installed on said solenoid support member and a solenoid operating circuit for operating said solenoid in such a manner that said solenoid is energized to attract thereto said pressing plate against a bias of said blocking force generating member for thereby putting said diaphragm into a state of being freed in movement and de-energized to allow said pressing plate to urge said blocking portion of said diaphragm against said seating surface of said outer casing member for putting said diaphragm into a state of being restrained in movement.

8. The elastomeric damping device according to claim 7, wherein an oscilatory system, a mass and a spring of which are respectively constituted by a fluid within said restrictive fluid passageway and a resilience in expansion and contraction of said working chambers, is set to resonate at a frequency ranging from 30 to 40 Hz when said diaphragm is in a state of being freed in movement and at a frequency of about 10 Hz when said diaphragm is in a state of being restrained in movement.

9. The elastomeric damping device according to claim 8, wherein said inner casing member is attached to one of a power unit mounting and a vehicle body and said outer casing member is attached to the other of said power unit mounting said vehicle body, said solenoid being energized at stoppage of an associated vehicle and de-energized at running of the vehicle.

10. The elastomeric damping device according to claim 4, wherein said diaphragm restraining means further comprises a solenoid support disposed outside of said pressing plate and attached to said outer casing member, a solenoid disposed outside of said solenoid support, an electromanetically attractable pin-like member secured to said pressing plate and extending through said solenoid support to have a flanged outer end and a solenoid operating circuit for operating said solenoid in such a manner that said solenoid is energized to attract thereto said pin-like member together with said pressing plate against a bias of said blocking force generating member for thereby putting said diaphragm into a state of being freed in movement and de-energized to allow said pressing plate to urge said blocking portion of said diaphragm against said seating surface of said outer casing member under the bias of said blocking force generating member for thereby putting said diaphragm into a state of being restrained in movement.

11. The elastomeric damping device according to claim 1, further comprising a third working chamber in said pockets enclosed between said resilient deformable member and said outer casing member, said third working chamber containing a fluid, and a second restrictive fluid passageway between said outer casing member and said resilient deformable member to provide communication between said first and third working chambers, said second restrictive fluid passageway being longer than said first-mentioned restrictive fluid passageway.

12. The elastomeric damping device according to claim 11, wherein said main resilient deformable member has a narrow opening extending along said second and third working chambers to form a diaphragm-like wall defining said second and third working chambers.

13. The elastomeric damping device according to claim 12, wherein said diaphragm restraining means further comprises a solenoid support attached to said outer casing member, a resilient support for resiliently supporting said pressing plate upon said solenoid support and a blocking force generating member disposed between said pressing plate and said solenoid support for urging said pressing plate together with said diaphragm against said seating surface of said outer casing.

14. The elastomeric damping device according to claim 13, wherein said blocking force generating member is in the form of a coiled spring installed in a compressed state such that it is always urged to expand axially.

15. The elastomeric damping device according to claim 14, wherein said diaphragm restraining means further comprises a solenoid installed on said solenoid support and a solenoid operating circuit for operating said solenoid in such a manner that said solenoid is energized to attract thereto said pressing plate against the bias of said blocking force generating member for thereby putting said diaphragm into a state of being freed in movement and de-energized to allow said pressing plate to urge said blocking portion of said diaphragm against said seating surface of said outer casing member for thereby putting said diaphragm into a state of being restrained in movement.

16. The elastomeric damping device according to claim 15, wherein an oscillatory system, a mass and a spring of which are respectively constituted by a fluid within said first-mentioned restrictive fluid passageway and a resilience in expansion and contraction of said first and second working chambers, is set to resonate at a frequency ranging from 30 to 40 Hz when said diaphragm is a state of being restrained in movement.

17. The elastomeric damping device according to claim 16, wherein an oscillatory system, a mass and a spring of which are respectively constituted by a fluid within said second restrictive fluid passageway and a resilienece in expansion and constraction of said first and third working chambers, is set to resonate at a frequency of about 10 Hz when said diaphragm is in a state of being restrained in movement.

18. The elastomeric damping device according to claim 17, being further resonant at a frequency of about 200 Hz when said diaphragm is in a state of being freed in movement.

19. The elastomeric damping device according to claim 18, wherein said inner casing member is attached to one of a power unit mounting and a vehicle body and said outer casing member is attached to the other of same, said solenoid being de-energized at stoppage and normal running of an associated vehicle and de-energized at particular vehicle running where said damping device is subjected to engine vibration causative of booming sound.

20. The elastomeric damping device according to claim 1, further comprising a ring member of a channel-shaped cross section and interposed between said main resilient deformable member and said outer casing member to define therebetween said restrictive fluid passageway which is part-circular in shape and extends along an inner periphery of said outer casing member.

* * * * *